United States Patent [19]

Bussiere

[11] Patent Number: 5,191,942
[45] Date of Patent: Mar. 9, 1993

[54] AGRICULTURAL FRAME FOR PROPULSION OF GROUND WORKING IMPLEMENTS

[75] Inventor: Raymond Bussiere, Saskatchewan, Canada

[73] Assignee: High-Line Manufacturing Inc., Vonda, Canada

[21] Appl. No.: 540,005

[22] Filed: Jun. 19, 1990

[51] Int. Cl.$^5$ .............................. A01B 73/00
[52] U.S. Cl. ..................... 172/286; 172/248; 172/467; 172/311; 172/456; 56/385
[58] Field of Search ............... 172/286, 248, 467, 311, 172/456; 56/385

[56] References Cited

U.S. PATENT DOCUMENTS

| | | | |
|---|---|---|---|
| 2,327,930 | 8/1943 | Ranney | 172/286 |
| 3,828,860 | 8/1974 | Poland | 172/311 |
| 3,935,696 | 2/1976 | Pavel | 172/311 |
| 4,341,269 | 7/1982 | Hann | 172/311 |
| 4,402,367 | 9/1983 | Couser | 172/311 |
| 4,418,762 | 12/1983 | Page . | |
| 4,813,489 | 3/1989 | Just et al. . | |
| 4,907,652 | 3/1990 | Henry et al. | 172/311 |

FOREIGN PATENT DOCUMENTS 1099566 4/1981 Canada .
1267318 4/1990 Canada .

OTHER PUBLICATIONS

Brochure of Bourgault entitled Wing Type Packer, Brochure of Rite-Way entitled Fold Up Packer Harrow System for Air Seeders; Brochure of Riteway entitled Hydraulic Harrow Packar Drawbars.

Primary Examiner—Randolph A. Reese
Assistant Examiner—Timothy Aberle
Attorney, Agent, or Firm—Adrian D. Battison; Stanely G. Ade; Murray E. Thrift

[57] ABSTRACT

An agricultural frame particularly for transporting active harrow elements and packer elements comprises a central frame section and a pair of wing frames projecting outwardly to the side of the central frame section at right angles thereto. The whole of the frame can be raised and lowered to lift the ground working implements from the ground. Each of the wing frames is rigid and is formed from a front beam and a rear beam interconnected by inclined beams carrying the active harrow elements. Each wing frame includes a steerable wheel at the outside end. Each wing frame is attached to the central frame by a rear pivot member which allows pivotal movement about a forward horizontal axis and also pivotal movement about a vertical axis for movement to the transport position. A latch is provided adjacent the front beam of the wing frame and is defined by a horizontal pin the axis of which defines the horizontal axis of pivotal movement of the wing frame. The latch pin is held in place within a receptacle of a hook member.

23 Claims, 9 Drawing Sheets

AGRICULTURAL FRAME FOR PROPULSION OF GROUND WORKING IMPLEMENTS

This invention relates to an agricultural frame for propulsion of ground working implements which is particularly but not exclusively designed for a harrow and packing action.

Recent developments in agricultural practices have led to a significant increase in demand for equipment which can carry out a harrowing and a packing function. Conventionally packers include either a plurality of separate packing rollers or wheels which are arranged in a gang; alternatively, a coil type packer arrangement can be used. In both cases the device is generally trailed behind a tool bar or transverse beam on which the device is attached. In more recent developments, instead of having a long trailing hitch or tong on which the packer arrangement is attached, the packer is more closely coupled to the tool bar simply by a pair of short depending arms arranged at respective ends of the packer member and allowed a limited amount of pivotal action about a horizontal axis. This arrangement has the advantage that the packers are more closely controlled by the tool bar and accordingly they can be arranged end to end without necessity for an overlap between the packer members. In many cases packers of this type are removed from working position by lifting the tool bar so that the pivot arms reach a lower most stop at which time the packers are lifted from the ground.

Conventionally harrows comprise simply a frame which carries a plurality of vertically depending fixed tines which extend from the frame down into contact with the ground so that as the frame is pulled forwardly the tines carry out a harrowing action on the surface of the ground. Harrow frames of this type have been widely used for many years and in many cases are simply trailed behind a tool bar on chains. In addition more rigid arrangements are provided on a trailing arm arrangement which is spring biased into engagement with the ground. In both cases the device of this type is often mounted on the same tool bar as the packers with the packers either arranged forwardly or rearwardly of the harrowing frames.

Frames of this type using a single tool bar generally include a centre section and a pair of wing sections extending outwardly to the sides. Conversion from an operating position to a transport position is generally obtained by twisting the tool bar about its longitudinal axis to raise both the harrow frames and the packer members away from the ground following which the wing frames are pivoted about an axis which is at that time vertical thus moving the wing frame portions into a trailing position parallel to the direction of forward movement of the device. In most cases wing frames include an outer wheel which is used in the working position and a second wheel which comes into contact with the ground as the tool bar is rotated about its longitudinal axis with a second wheel being used in the transport position. In an alternative arrangement, the outside wheel mounted at the end of the wing frame can be steerable so that a single wheel turns from the position at right angles to the longitudinal axis for the working position to a position parallel to the longitudinal axis for the transport position.

Harrow packer frames of this type have a number of difficulties and problems which are not yet resolved.

One problem area relates to the ineffectiveness of the harrowing action so that more attention has been recently given to designs of active harrow which increase the harrowing action.

One further problem area relates to the conversion of the device from the transport position back to the working position and this is generally carried out by reversing the tractor and attempting to drive the wing frame portions outwardly into the extended working position. This often is very difficult and requires the device to be backed up for significant distance before the required position is achieved.

Third area of problem relates to the linkage which connects between the outer ends of the wing frames and the centre frame portion for communicating the forward force in the working position to the outer ends. This linkage is often provided by a cable which is generally unsatisfactory and there is significant difficulty in moving the cable from the working position to the transport position and vice versa without generation of slack and tangling problems.

A yet further area of difficulty is that the device is difficult to convert from a harrow packing action to just a packing action which can in many cases be required. Often to remove the harrowing action or to remove the packing action requires the removal from the frame of the complete devices related to this action which of course is a lengthy and tedious operation involving significant manual effort.

There is therefore a significant requirement for an improved agricultural frame which can overcome or aleviate some or all of the above problems.

SUMMARY OF THE INVENTION

Generally this invention provides an improved frame particularly for transporting harrow elements and packer elements one in front of the other and at spaced positions across the width of the frame. The frame includes a center frame portion and a pair of wings which can be folded from the normal outwardly extending working position to a trailing position by movement about a vertical axis at the rear of the center frame. The wing frames are carried on wheels which can be steered to control movement to the working position by back-up of the frame. The wing frames include a rear beam for receiving some of the elements and a forward beam for receiving others of the elements and this provides a latch arrangement between the forward beam and the center frame which holds the frame in the working position and allows pivotal movement of the wing frame about a horizontal axis parallel to the direction of movement of the frame.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
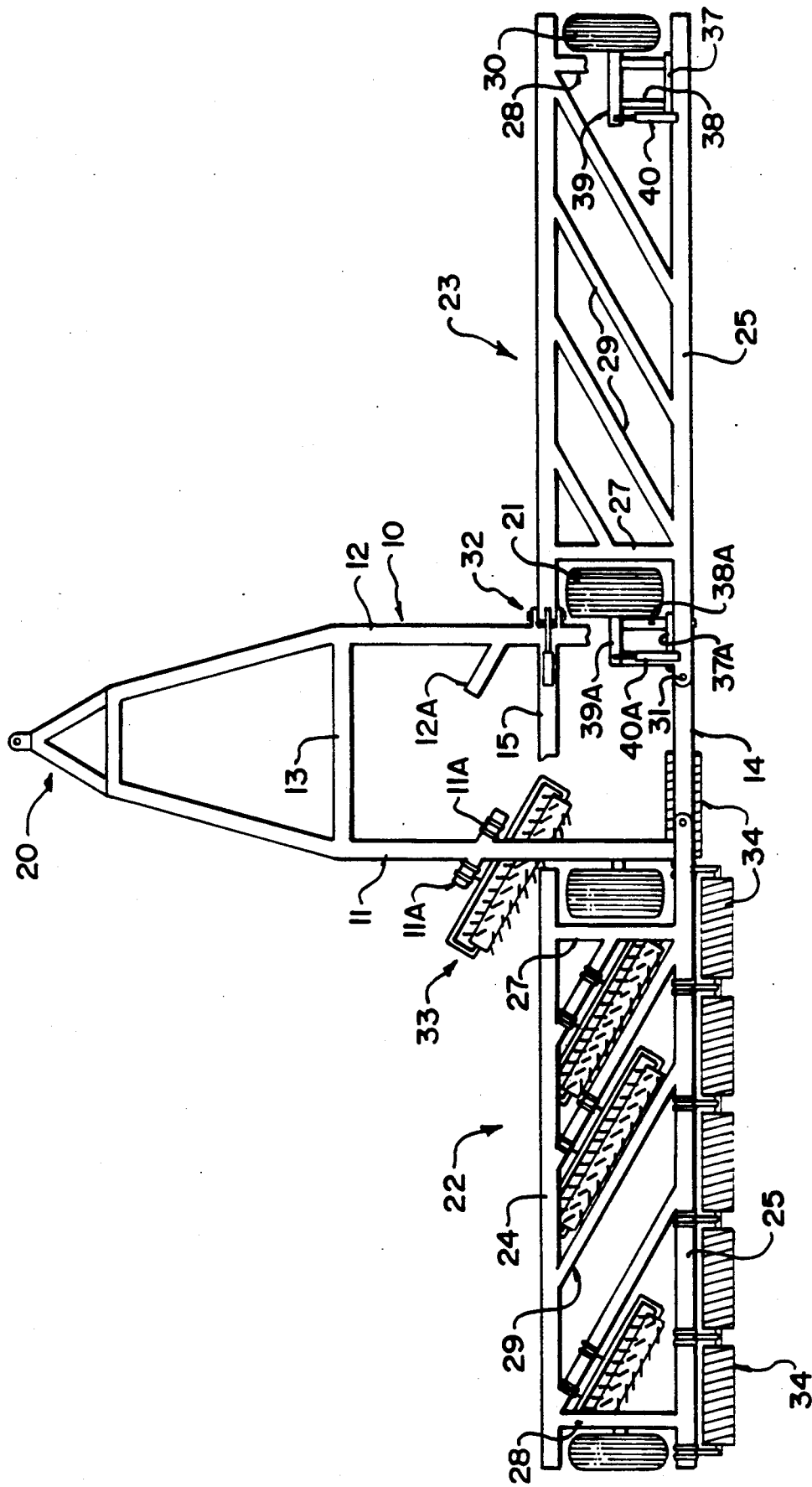
FIG. 1 is a top plan view of the agricultural frame according to the present invention with part of one wing frame broken away for convenience of illustration to show the wheel attachment assembly and with the agricultural implements on that wing frame being omitted.
Figure 2:
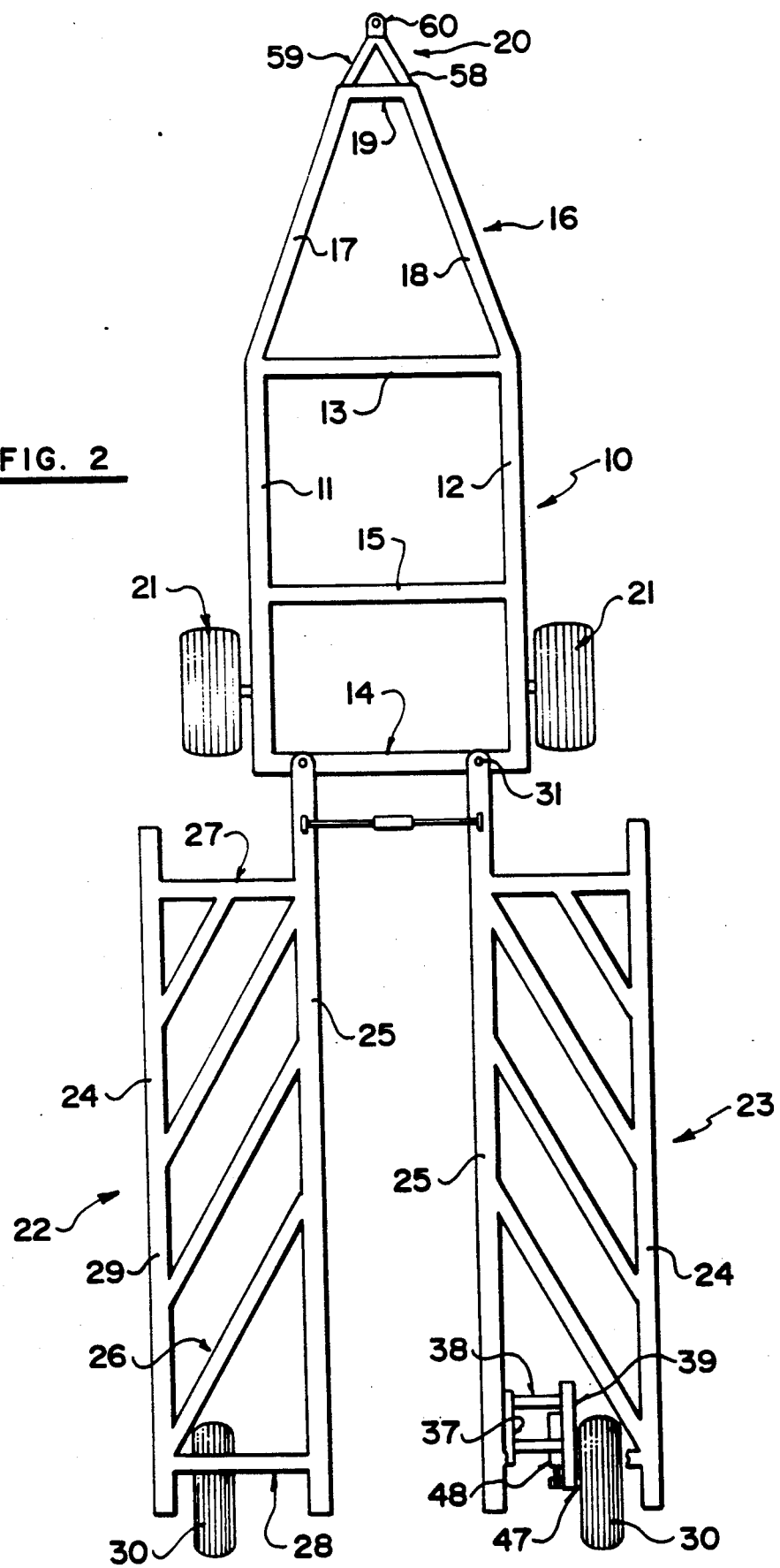
FIG. 2 is a top plan view of the frame of FIG. 1 in a transport position, all of the implements being omitted for convenience of illustration.

The whole machine is shown in plan view in FIGS. 1 and 2 with parts of the machine being shown schematically and parts omitted for convenience of illustration. The machine includes a central frame section 10 having a main rectangular portion defined by sides 11 and 12 together with transverse beams 13, 14 and 15 positioned at the front, rear and centre of the rectangular section as best shown in FIG. 2. At the front of the rectangular section is provided an inwardly inclined hitch section generally indicated at 16 and including sides 17 and 18 together with a transverse front beam 19. Connected to the front hitch beam 19 is a hitch section 20 shown in more detail in FIG. 6 and described hereinafter.

On each side of the centre frame section is mounted a ground wheel 21 each of which is mounted upon a suspension system omitted from FIG. 2 for convenience of illustration and shown in more detail on the right hand side of FIG. 1.

The frame further includes a pair of wing sections schematically indicated at 22 and 23 respectively for convenience of illustration again the ground working implements are shown only in the left hand side of FIG. 1 and are fully omitted in FIG. 2.

Each of the wing sections includes a forward main beam 24 and rearward main beam 25. Connecting between the beams are provided a plurality of transverse beams 26. An innermost end 127 of the transverse beams is arranged at right angles to the front and rear beam. An outer most end 128 of the transverse beam is similarly at right angles to the front and rear beams. In both cases the end most transverse beam is spaced inwardly from the end of the front and rear beams to provide a wheel receiving section outside the implement supporting section. In between the end most transverse beams is a plurality of inclined beams 29 which are parallel and as best shown in FIG. 1 are inclined to the front and rear beams so that a forward end of each transverse beam 29 lies outwardly of the rearward end thereof. The beams are arranged at an angle of the order of 30° degrees to the front and rear beams.

A ground wheel for the wing frame is indicated at 30 and is mounted within the area outside of the outermost transverse beam 28 and between the front and rear beams as best shown at the right hand end of FIG. 1. The ground wheel is mounted upon a suspension system shown for convenience only at the right hand end of FIG. 1 and described in more detail hereinafter.

Each of the wing frames has a first pivot coupling at the inward end thereof adjacent the centre frame section allowing pivotal movement about a horizontal axis parallel to the side beam 11 or 12 respectively of the centre frame section. This allows the wing frame to move up and down to accomodate changes in ground level.

In addition each wing frame is pivotally connected to the centre section for pivotal movement about a pin 31 which defines a vertical pivot axis allowing the wing frame to move from the working position shown in FIG. 1 to the transport position shown in FIG. 2. The pin 31 is mounted at an end of the rear beam 25 inwardly of the ends of the transverse rear beam 14 of the centre frame section. In the working position shown in FIG. 1, the wing frame is latched into the working position by a latch indicated at 32. The latch 32 and the pivot 31 hold the wing frame in the working position and provide the communication of force from the centre section to the wing frame section in the moving direction without the necessity of further coupling arrangements from the centre of the frame section to the wing frame. The latch 32 is described in more detail hereinafter but can be released to allow the wing frames to move rearwardly to the trailing position shown in FIG. 2. In the trailing position, the pivot connection 31 is positioned inwardly of the sides of the centre frame section so that the full width of the wing frames is an acceptable trailer width for transportation. It will also be noted from FIG. 2 that the wheels 30 are pivoted from the position shown in FIG. 1 in which the wheel is parallel to the working travel direction and at right angles to the longitudinal axis of the wing frame to the position shown in FIG. 2 in which the wheel lies parallel to the longitudinal axis of the wing frame that is it is moved through 90° degrees.

While the frame can transport various different ground working implements, it is particularly designed for transportation of active harrow members 33 and packer assemblies 34 arranged in rows across the frame for cooperation upon the ground across the full width of the frame. Thus as shown in FIG. 1 there are four active harrow members mounted on each of the wing frames with some of the active harrow members being omitted for convenience of illustration. The members overlap slightly so that there is a full action across the full width of the wing frame. Two members are mounted upon the centre frame section with one of the members being mounted upon a pair of stub beams 35 connected to the side beam 11 and 12 and arranged at an angle parallel to the transverse beams 29. A second of the members is mounted upon a stub beam 36 projecting inwardly from the side beam 12 of the centre frame. This arrangement which is not quite symmetrical allows the members to overlap with the four members on the one wing frame and the two members on the centre section being arranged in the same direction. It will then be noted that the transverse beams on the right hand wing frame are arranged in opposite direction to the transverse members on the left hand wing frame so that the active harrow members on that side are arranged in the opposite direction. This counters any tendancy of the whole machine to move sideways in view of the small sideways force which is generated by the active harrow member as it operates upon the ground.

The active harrow members are thus mounted substantially at the front beam 24 and are trailed on relatively short arms as described in more detail hereinafter between the front beam and the rear beam. On the rear beam is mounted the plurality of packer assemblies 34. The packer assemblies are arranged end to end and supportive of relatively short arms connected to the rear beam 25. The packer assemblies preferably include the conventional helical coil arrangement mounted upon the relatively short arms shown and described in more detail hereinafter and connected in bearings carried by the arms which allow lifting and pivotal movement of the packer assemblies.

Figure 3:
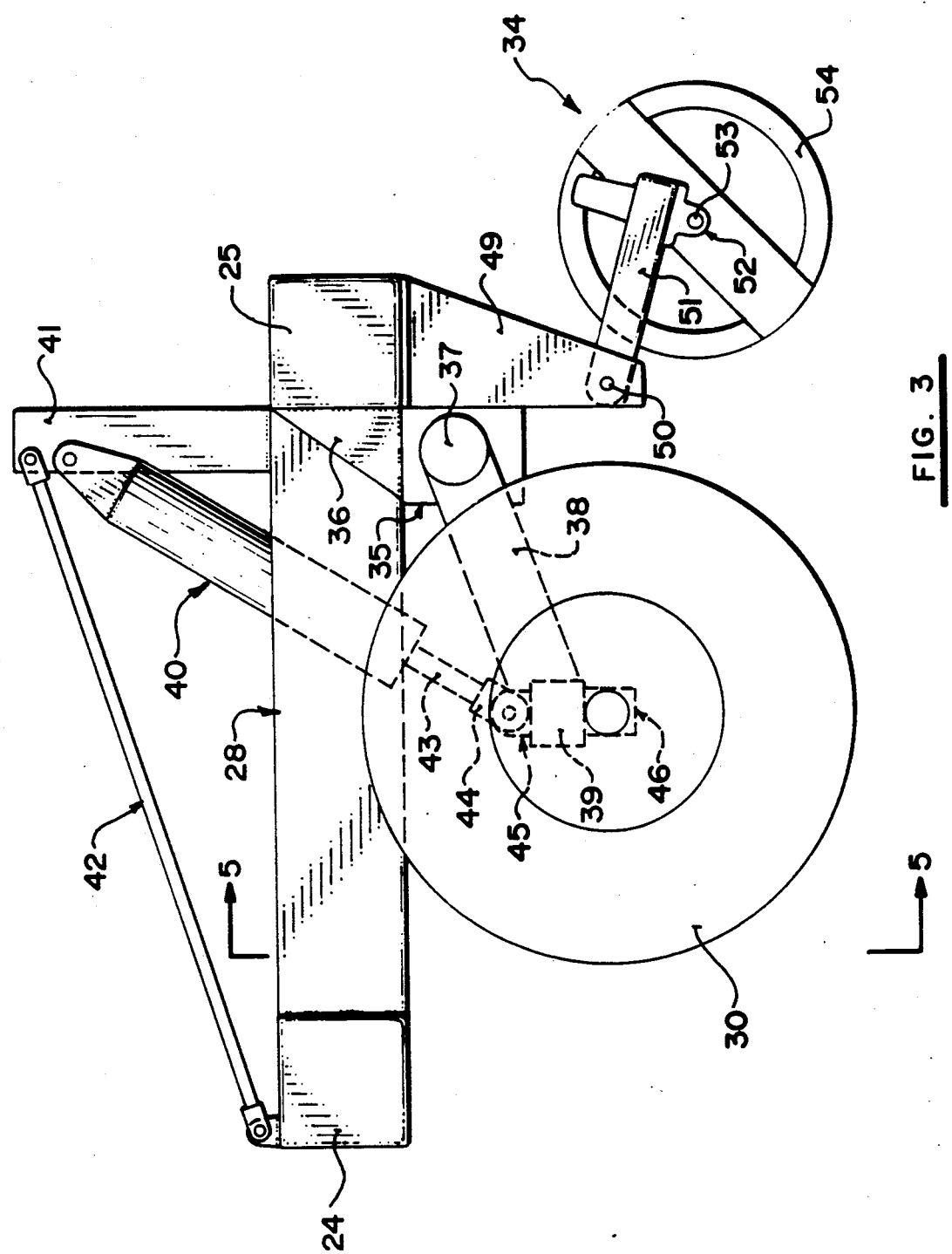
FIG. 3 is an end elevational view of one wing frame showing the device in a working position.
Figure 4:
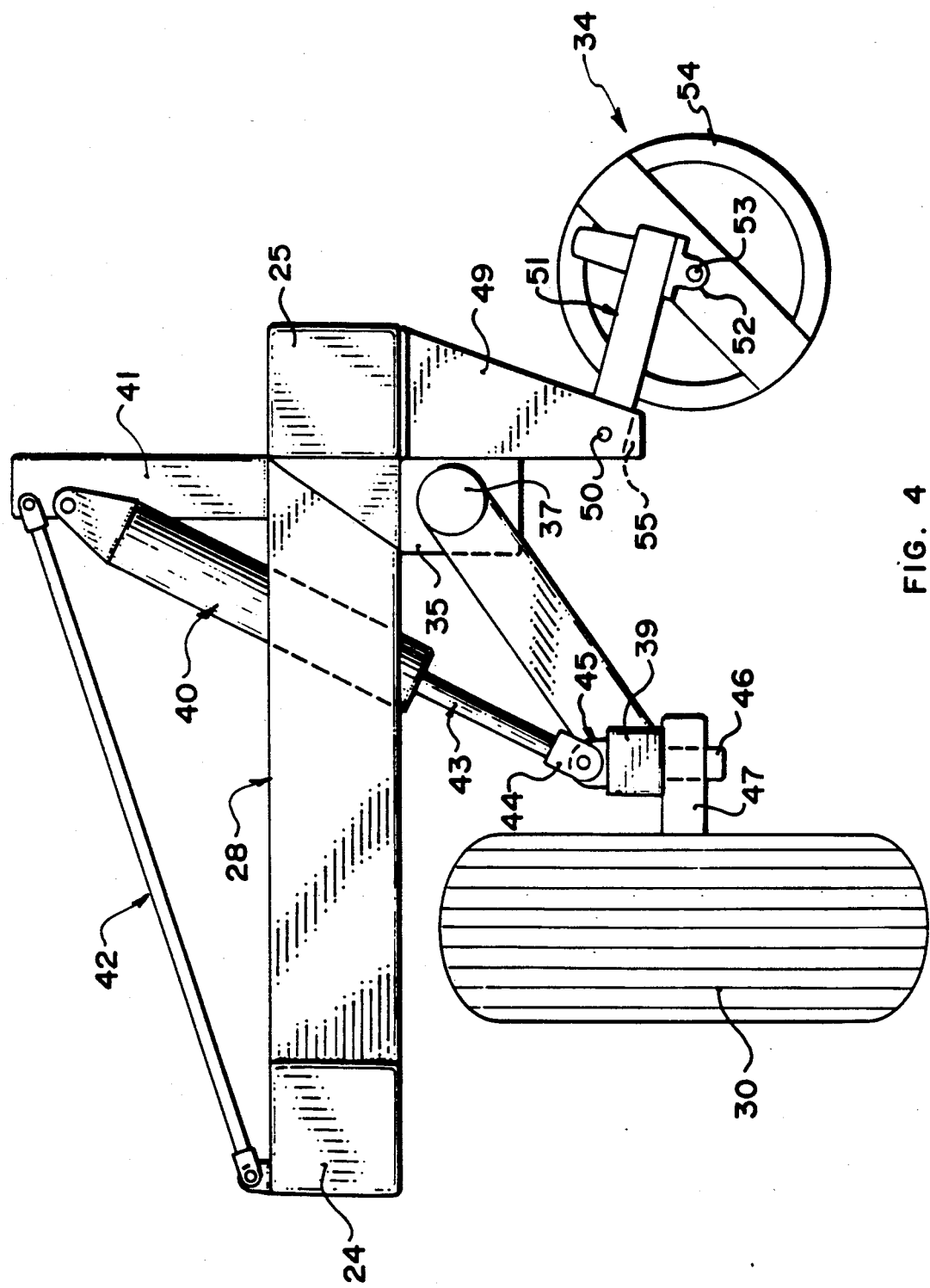
FIG. 4 is an end elevational view similar to that of FIG. 3 showing the device in the transport position.
Figure 5:
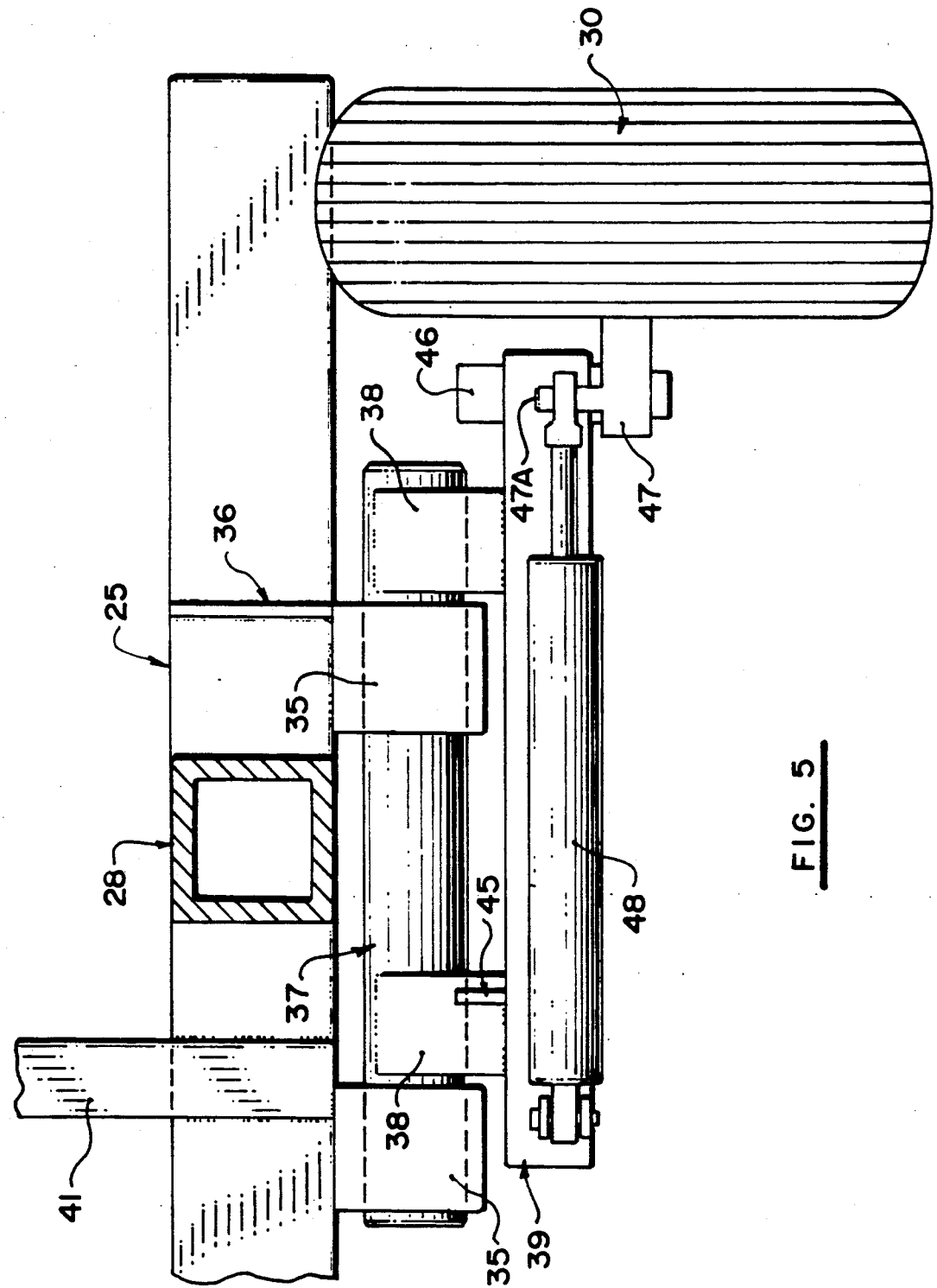
FIG. 5 is a cross sectional view along the lines 5—5 of FIG. 3.

Turning now to FIGS. 3, 4 and 5, the end of the wing frame is shown in more detail including the support structure for the wheel 30. Specifically this support structure comprises a pair of bearing blocks 35 connected on an underside of the beam 25 and supported relative thereto by a triangular flange 36. Across the bearing blocks 35 is mounted a rotatable shaft 37 which can pivot about an axis mounted underneath the beam 25 and parallel to the beam 25. A pair of support struts 38 are mounted upon the pivotal axle 37 and extend therefrom in a direction downwardly and across toward a position approximately centrally between the beams 24 and 25. At the lower end of the struts 38 is mounted a transverse beam 39 parallel to the axle 37 which extends between the struts 38 and outwardly beyond the outermost one of the struts to a support position for the wheel. A hydraulic cylinder 40 is connected upon a post 41 extending vertically from the beam 25 and reinforced by an inclined strut 42. The cylinder includes an actuating rod 43 having a clevis 44 connected to a lug 45 on the top of the beam 39. Thus actuation of the cylinder 40 causes the beam 39 to be raised and lowered relative to the shaft 37 by the pivotal movement around the shaft 37.

At the outboard end of the beam 39 is attached a vertical bearing assembly 46. The axle of the wheel 30 is indicated at 47 and is mounted upon a rotatable piece carried on the bearing assembly 46 so that the axle can rotate around the vertical axis defined by the bearing assembly 46. The movement of the axle is actuated by a cylinder 48 carried on a lug mounted on the side of the beam 39 and operating upon an extension portion of the axle 47 including a pin 47A. For convenience of illustration the cylinder 48 is omitted from the drawings of FIGS. 3 and 4 but the operation of the cylinder will be apparent from those drawings in which the wheel 30 is positioned in the working position in FIG. 3 and is rotated through 90° degrees to the transport position as shown in FIG. 4. At the same time in the transport position, the beam 39 has been moved downwardly about the axle 37 so that the frame is raised to a position in which the ground working implements are removed from the ground.

The packer assembly 34 is mounted on the beam 25. The mounting arrangement comprises a plate shaped support bracket 49 which extends vertically downwardly from the underside of the beam 25. Support bracket is attached to the beam by the conventional wire loops which clamp the bracket to the beam 25. The bracket includes a pivot pin 50 at a lower apex thereof allowing pivotal movement of a rearwardly extending link 51. The outer end of the link carries bearings 52 which support the shaft 53 of a conventional helical packer element 54. In a position shown in FIG. 3, with the wheel in the raised position and thus the frame in the lowered position, the packer element can roll upon the ground and is free to raise and lower relative to the wheel on the pivotal link 51. Twisting movement is accommodated by suitable mounting of the pin 50 or the bearings 52 to allow limited twisting of the packer element.

In the raised position of the frame shown in FIG. 4, however, the link 51 engages a lower end stop 55 so that the packer element can fall no further than the stop 55 and thus is raised above the ground when the wheel is moved to the lower position and thus the frame raised.

Reverting briefly to FIG. 1, it will be noted that the wheel 21 is mounted upon the transverse rear beam 14 in a similar manner to the mounting of the wheel 30 on the rear beam 25. Thus the mounting includes an axis 37A, a transverse beam 39A a pair of struts 38A and a cylinder 40A which operate in the manner previously described. There is however no steering action of the wheel and hence the wheel is simply mounted on the end of the beam 39A to which the axle of the wheel is attached.

Figure 6:
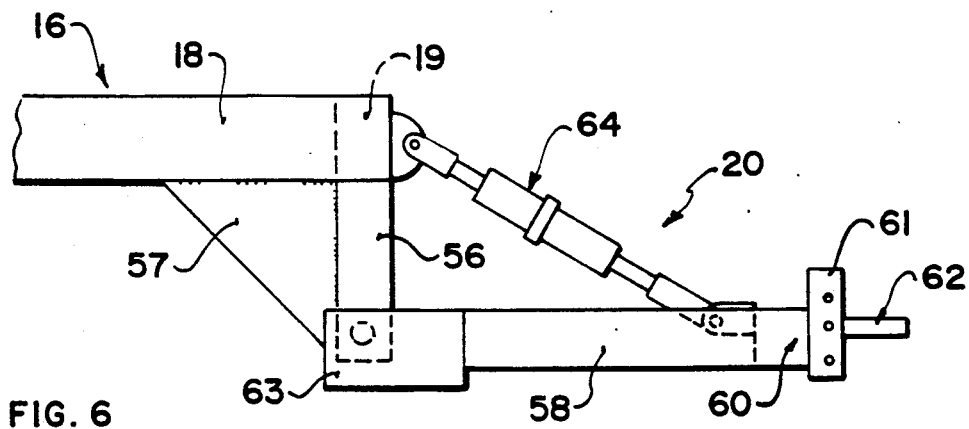
FIG. 6 is a side elevational view of the front portion of the centre frame showing the hitch for attachment to the tractor.

Turning now to FIG. 6, the hitch portion 20 is shown in more detail coupled to the front of the section 16. Particularly the hitch section includes a pair of vertical posts 56 each mounted under a forward end of the respective one of the frame members 17 and 18. A reinforcing flange 57 is provided to communicate the force from the hitch. The hitch portion itself includes a triangular frame defined by a pair of side elements 58 and 59 which converge to a front apex 60 on which is mounted a channel iron 61 and a hitch tong 62 the height of which is adjustable over a limited range defined by the channel 61. The rear end of each of the side elements 58 and 59 includes a flange 63 which is pivotally coupled to the lower end of the respective one of the posts 56. The angle of the hitch portion relative to the main part of the central frame section can be adjusted by a turnbuckle arrangement 64. This angle adjustment provides an adjustment of the height of the front end of the central frame so as to ensure as far as possible that the central frame is maintained with the beams thereof in a horizontal plane while the device is in the working position so that relative height of the front and rear beams 24 and 25 of the device are maintained substantially equal to provide a proper operation of both the front ground working implements and the rear ground working implements.

Figure 7:
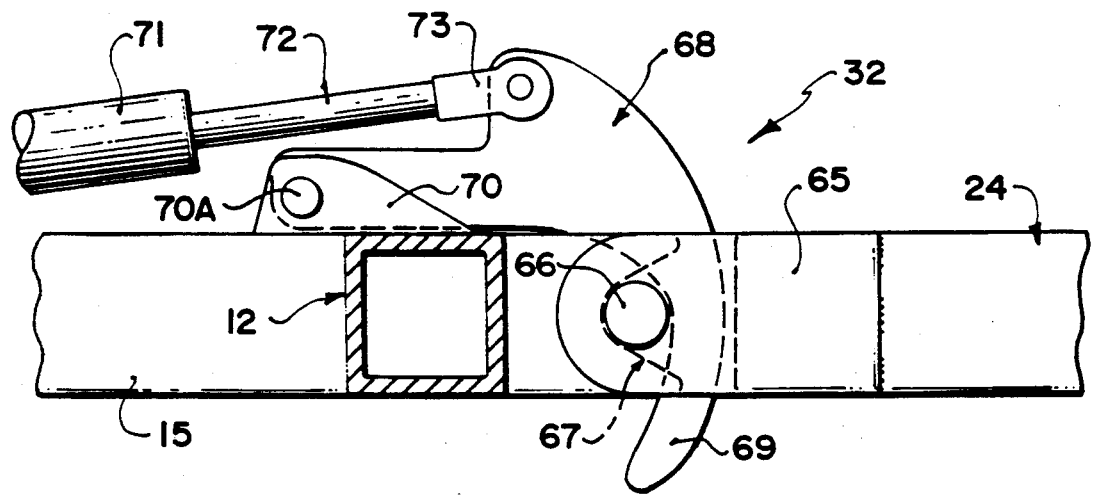
FIG. 7 is a cross sectional view along the lines showing the latch arrangement.
Figure 8:
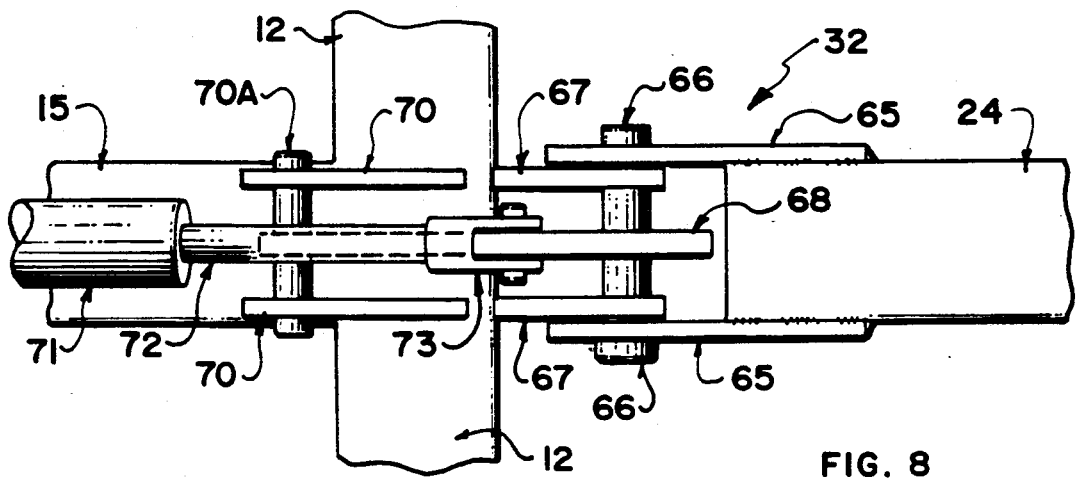
FIG. 8 is a top plan view of the latch arrangement of FIG. 7.

Turning now to FIGS. 7 and 8, the latch 32 is shown in more detail. Specifically the latch is mounted at the inner end of the front beam 24 of each of the wing frames. On the beam 24 is mounted a pair of side plates 65 which extend outwardly beyond the end of the beam 24 and carry a transverse pin 66 having an axis lying in a horizontal plane.

Upon the outside surface of the respective side of the central frame is mounted a receiving section defined by a pair of plates 67 each of which defines a V-shaped receptacle with the V facing outwardly from the side of the central frame for receiving the pin 66 at the base of the V as best shown in FIG. 7. In addition the central frame carries a hook member 68 with a nose 69 which wraps around the pin 66 to hold it in place within the V of the receptacle plates 67. The pin is thus confined against movement away from the central frame and also against vertical movement. The pin is however free to rotate about the longitudinal axis of the pin between the bearing surfaces defined by the V shaped receptacle and the inside surface of the nose 69 to allow the beam 24 to pivot in a vertical direction around the axis of the pin 66.

The hook shaped member 68 is mounted for pivotal movement on a pin 70A carried on the transverse beam 15 on a pair of lugs 70 welded thereto. The hook shaped member is movable from a latched position shown in the drawings to a release position in which the lower end of the nose is lifted away from the pin 66 by a cylinder 71 an actuating rod 72 coupled by a clevis 73 to an upper flange portion of the hook member 68.

Figure 9:
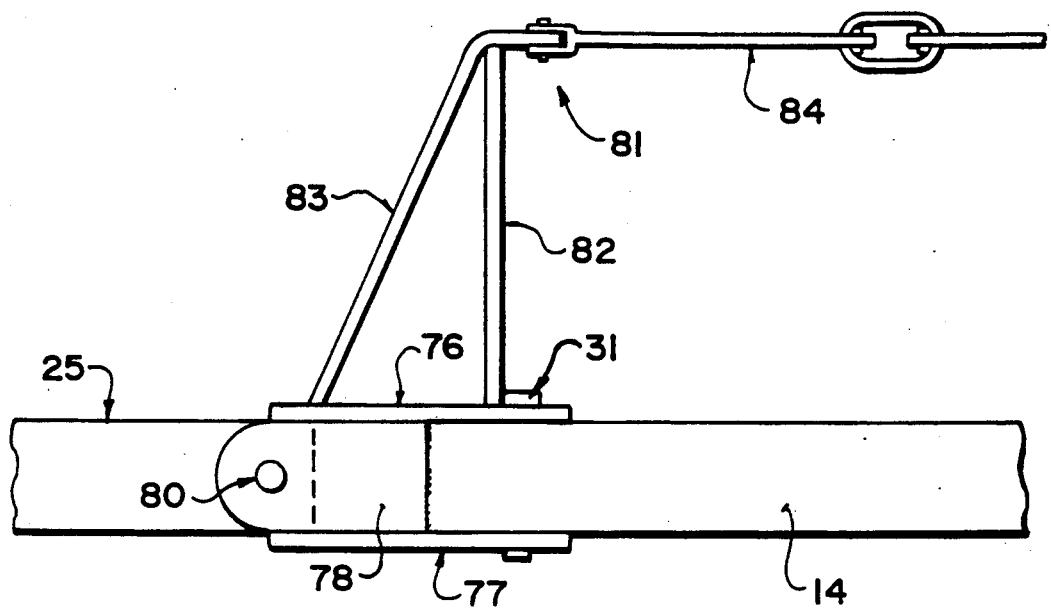
FIG. 9 is a rear elevational view of along the lines showing more detail of the pivot coupling between the wing frame and the centre frame.
Figure 10:
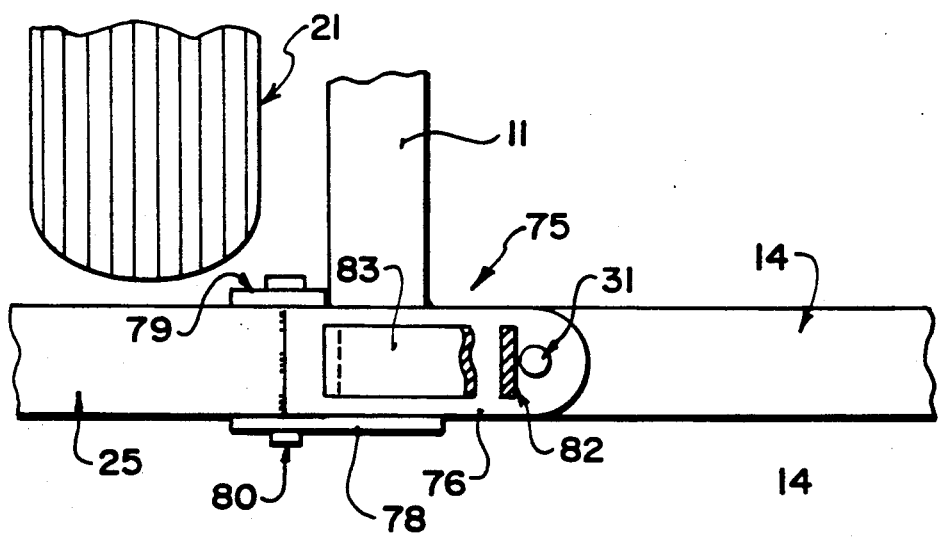
FIG. 10 is a top plan view of the coupling portion of FIG. 9.

Turning now to FIGS. 9 and 10 the coupling of the rear beam 25 to the rear beam of the central frame 14 including the pivot pin 31 is shown in more detail.

Thus the rear beam 25 of the wing frame is connected to the rear beam 14 by a coupling element generally indicated at 75 which comprises an upper plate 76, a parallel lower plate 77 and a pair of side plates 78 and 79 which are welded together to form a rigid structure. The upper and lower plates 76 and 77 extend to the right to a position beyond the side plate 78 and 79 to receive the vertical coupling pin 31 which passes through the plate 76 and 77 and through the beam 14 at a position spaced from the end of the beam 14 at the side of the central frame. In practice this spacing of the pin 31 is arranged to be of the order of 18 inches. The side plate 79 is relatively short and is coupled to the upper and lower plates 76 and 77 only by a short distance of the order of 4 to 6 inches. The side plate 79 thus clears the outside edge of the beam 11 as best shown in FIG. 10 and allows the coupling element 75 to pivot into the position shown in FIG. 10 up to an engagment of the side plate 78 with the end of the beam 11 that is the side of the beam 14. Thus the side plate 78 can extend in the direction to the right to a position beyond the end of the beam 14 but remains spaced from the pin 31 to allow pivotal movement of the wing frame around the pin 31 while in the transport position for a steering action.

Through the side plates 78 and 79 is mounted a further pin 80 which passes through the side plates and through the vertical side surfaces of the beam 25 allowing pivotal movement in an upward and downward direction of the beam 25 about the horizontal axis defined by the pin 80.

The pin 80 is aligned with the pin 66 of the latch arrangement 32 so that the pivotal action of the wing frame occurs about the same horizontal axis with the latch acting to provide both functions of latching the wing frame in position and also providing the pivotal action of the wing frame.

A tierod structure 81 is mounted on the link 75 and includes a vertical post 82 reinforced by an inclined post 83 and a tierod 84 which extends to a similar structure on the coupling element at the right hand corner of the centre frame (not shown). This tierod structure maintains the framework rectangular and can be adjusted to prevent inaccuracies and twisting occuring due to various manufacturing and wear tolerances.

Figure 11:
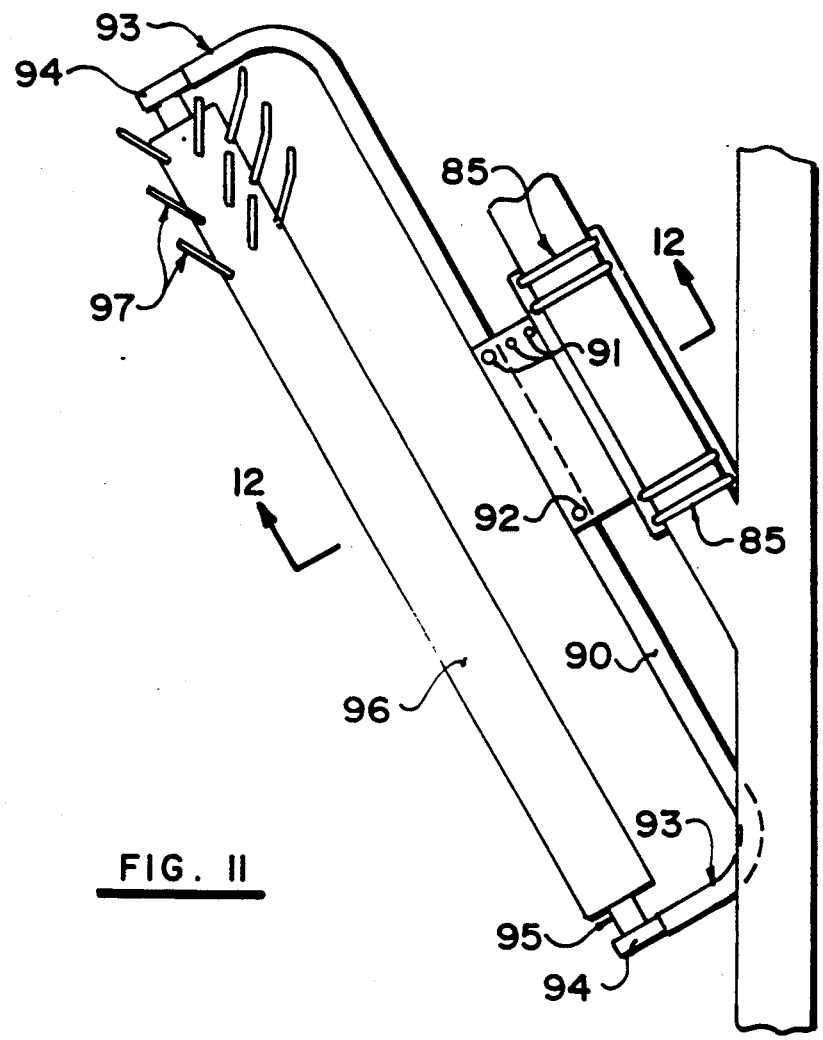
FIG. 11 is a top plan view of one of the active harrow arrangements and its coupling to the frame.
Figure 12:
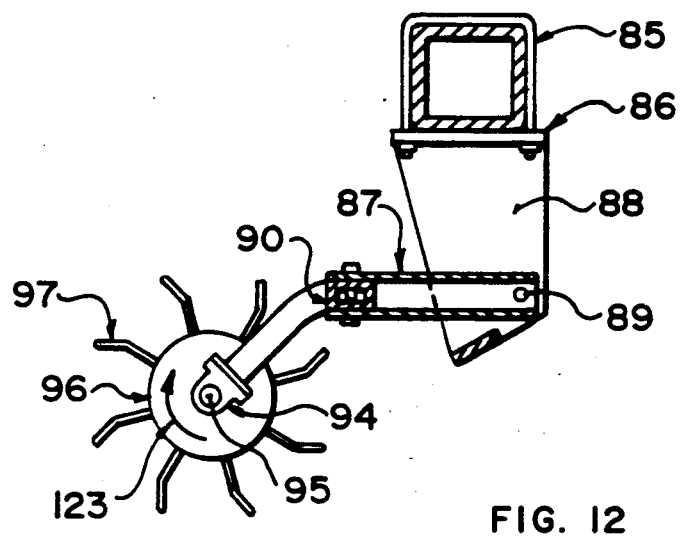
FIG. 12 is a cross sectional view along the lines 12—12 of FIG. 11.

Turning now to FIGS. 11 and 12, the details of the mounting structure for the active harrow member are shown. It will be noted that the active harrow members are mounted on the inclined transverse beams and on the inclined beams mounted on the centre frame so as to position the active harrow member at an angle of the order of 30° degrees relative to a line at right angles to the working direction of the implement.

Specifically the mounting is provided a conventional loop and plate clamping structure comprising a pair of loops 85 and a bottom plate 86 which are clamped around the respective one of the beams of the frame. Two such clamping elements are provided at each end of a support plate 87. Each clamping element carries a vertical plate 88 which extends downwardly therefrom and defines a horizontal pivot pin 89 for the plate 87 parallel to the beam and directly beneath the beam. The plate 87 includes an upper sheet and a lower sheet surrounding the horizontal pin 89. Between the sheets are mounted a transverse beam 90 which is thus mounted parallel to the main beam on which the implement is mounted and movable in a vertical direction by pivotal action around the pin 89. The angle of the beam 90 relative to the plate 87 can be adjusted by the bolting the beam 90 at different bolting locations 91 at one end of the plate 87 relative to a single location 92 at the other end of the plate 87. The beam extends outwardly to the sides of the plate 87 and includes downturned and rearwardly turned beam ends 93 which turn substantially through 90° degrees and also turn downwardly as visible in FIGS. 11 and 12. At the end of each of the beam ends 93 is mounted a bearing 94 receiving a shaft 95 connected between the bearings 94 and thus lying parallel to the beam 90. On the shaft 95 is carried a cylindrical support body 96 which rotates around the axis of the shaft 95 and carries a plurality of tines 97 which project outwardly from the cylindrical peripheral surface of the support body 96.

Figure 13:
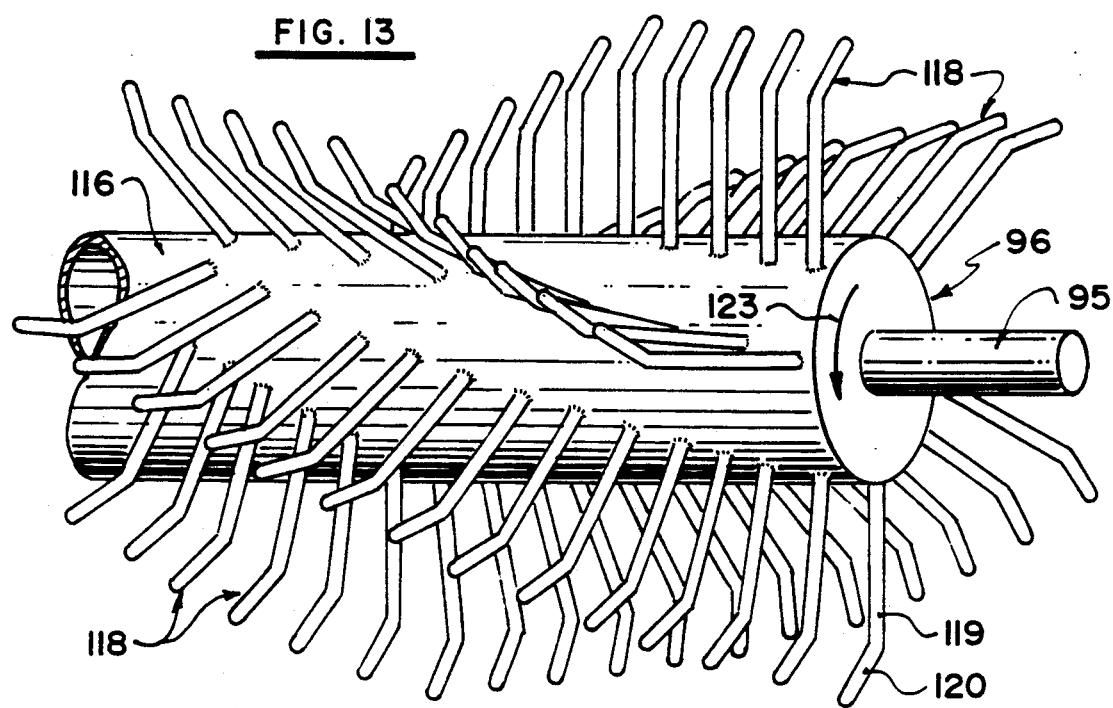
FIG. 13 is an isometric view of one active harrowing element.
Figure 14:
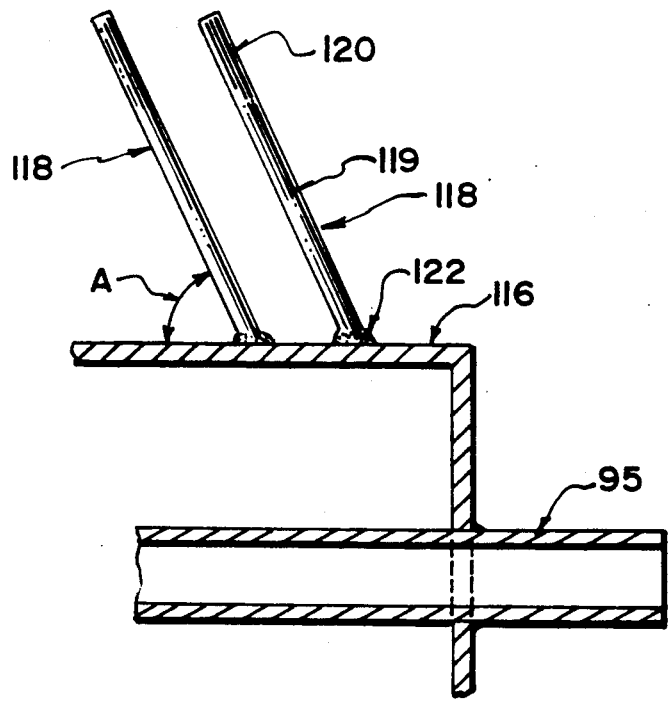
FIG. 14 is a longitudinal cross sectional view through the active harrowing element of FIGS. 11, 12 and 13.

Turning now to FIGS. 13 and 14, the cylindrical wall 116 of the support body 96 is formed of steel and is substantially continuous and imperforate.

Attached to the outer surface of the peripheral wall 116 is a plurality of tines 118 which project outwardly from the outer surface for engaging the ground. The tines are all substantially identical. The tines are mounted in rows are best shown in FIG. 12 with the rows being angularly spaced around the wall 116. In the example shown in FIG. 12 there are eight such rows of tines but this number can be increased or decreased in accordance with the requirements and in accordance with the diameter of the wall 116. In one preferred example, the number of tines at each axially spaced position is six. The tines at a next adjacent position are offset angularly with regard to the tines at a first position by an angle equal to one half of the angle between the tines at the first position.

Each of the tines have the main body portion 119 and an end portion 120 cranked or bent relative to the main body portion as best shown in FIGS. 12 and 13. In one embodiment as an example the main body portion can have a length lying in the range three inches to five inches with the end portion having the length of the order of two inches. The angle between the end portion and the main body portion can be in the range 20° to 30°.

Each tine is separately welded to the outer surface of the wall 16 as indicated in FIG. 14 by the weld line 122. The weld is carried out by a high pressure welding technique allowing the base of the tine to be directly attached to the outer surface in a manner which remains rigidly attached with little or no flexing of the tine. In one practical example the tine has a diameter of the order of ⅜ inch and thus is formed from relatively heavy rod providing little opportunity for flexing and providing significant strength to resist damage from engagement with stones, rocks or other obstacles.

The orientation of the tines is best shown in FIGS. 12 and 14. From FIG. 12 it will be noted that the tines lie so that in the end elevation they extend substantially radially outwardly from the axis that is they lie in an axial plane. The end portion is however cranked out of the axial plane in a direction rearwardly relative to the direction of motion indicated at 123.

The orientation is further available from FIG. 14 in which it will be noted that each tine is inclined relative to the axis of the support surface 116 so that it lies an angle less than 90° as indicated at angle A. This angle preferably lies in the range 60° to 70° so that the angle between the radial plane and the tine lies in the range 20° tp 30°. In addition the upper part 120 of each tine lies in the same plane with the plane lying transverse to the axis but inclined to the axis at the angle defined above.

This orientation of the tine has been found surprisingly to allow the tines to discard any trash in the form of straw or other plant material which tends to collect around the tines. In one practical example the diameter of the wall 116 is in the range 4½ to 9 inches. A space between each tine and the next adjacent tine is preference in the range 2 to 6 inches. This positioning, orientation and spacing of the tines provides an effective harrowing action as the device is drawn across the ground.

In addition the effectiveness of the harrowing action can be significantly increased by reversing the direction of the tines so that the end portions project forwardly rather than rearwardly as shown in FIG. 12. Thus in FIG. 13 the end portions project forwardly and thus provides a vigorous harrowing action as the end portions tend to project into the ground as the tines move forwardly as the devices rolls on the ground. The reversed position can be obtained simply by removing the shaft 95 and support element 116 and reversing the whole unit relative to the yoke.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural frame for propulsion of ground working implements across a field in a working position and in a transport position comprising a centre frame having a hitch portion for attachment to a tractor, ground wheels mounted on the centre frame for movement of the centre frame across the ground in a direction of forward movement, a pair of wing frames attached to the centre frame each at a respective side of the centre frame, a ground wheel mounted on each wing frame for movement of the wing frame across the ground, a plurality of ground working implements each mounted on a respective one of the centre frame and the wing frames for movement therewith, means mounting each ground wheel on the respective one of the centre and wing frames for movement in a vertical direction relative to the respective one of the frames from a first position in which the ground working implements on said one frame are in ground working engagement with the ground to a second raised position in which the ground working implements are in raised non-operative position above the ground, first connecting means connecting each wing frame to the centre frame for pivotal movement about a horizontal axis substantially parallel to the forward direction, second connecting means connecting each wing frame to the centre frame for pivotal movement about a vertical axis for movement from a working position in which a longitudinal axis of the wing frame projects outwardly to a respective side of the centre frame in a direction generally at right angles to the forward direction to a transport position trailing rearwardly of the centre frame in which said longitudinal axis extends therefrom in a direction parallel to the forward direction, and means for steering the ground wheel on each wing frame from a position at right angles to said longitudinal axis to a position parallel to the longitudinal axis, each wing frame including a front beam parallel to said longitudinal axis, a rear beam parallel to said longitudinal axis and spaced rearwardly of the front beam and a plurality of transverse beams interconnecting the front and rear beams, said second connecting means being arranged to provide said vertical axis adjacent said rear beam, and latch means for releasable coupling between the centre frame and the wing frame at a position forwardly of said vertical pivot axis, said latch means including a pin having a longitudinal axis of the pin lying along said horizontal axis with said pin mounted on one of said centre frame and said wing frame, a receptacle mounted on the other of said centre frame and said wing frame for receiving said pin for pivotal movement of the pin relative to the receptacle about said axis longitudinal of the pin and transverse to the receptacle and a latch member for engaging the pin and pulling the pin into said receptacle, said latch means thus providing one part of said first connecting means.

2. An argricultural frame according to claim 1 wherein the latch means is arranged at the front beam and extends therefrom to the centre frame.

3. An agricultural frame according to claim 1 including means for communicating forward movement to said wing frame from said centre frame consisting solely of said second coupling means and said latch means.

4. An agricultural frame according to claim 1 wherein said ground wheel of said wing frame is positioned between said front and rear beams.

5. An agricultural frame according to claim 1 wherein the centre frame includes a first and a second ground wheel each mounted on a respective side thereof so as to extend outwardly to the respective side, the ground wheel on each side being positioned between the front and rear beams of the wing frame and inwardly of an inner most one of the transverse beams.

6. An agricultural frame according to claim 1 wherein each wing frame includes an extension member extending therefrom along a portion of the centre frame and wherein the second coupling means is arranged to define said vertical axis at an inner end of said extension member inwardly of the respective side of the centre frame.

7. An agricultural frame according to claim 1 wherein said ground working implements include a plurality of active harrow members each including a support body for rotation relative to the ground and a plurality of tines projecting from the support body and wherein the ground working implements further include a plurality of packer assemblies each including packer surfaces for engaging the ground and wherein there is provided means mounting the active harrow members and the packer assemblies on the frame such that the active harrow members are arranged substantially in a row across the frame for providing the harrowing action across the full width of the frame and wherein the packer assemblies are arranged substantially in a row across the frames so as to provide a packing action across the full width of the frame, one of the rows being arranged in front of the other row.

8. An agricultural frame according to claim 7 wherein the active harrow members and the packer assemblies each include support arm means extending rearwardly from a point of connection on the frame to the respective one of the active harrow members and packer assemblies, and wherein the support means of one of the rows is mounted at a position adjacent the front beams and the support arm means of the other of the rows is mounted adjacent the rear beam.

9. An agricultural frame according to claim 7 including means for latching each of the active harrow members in a raised position such that in the first position only the packer assemblies are in engagement with the ground.

10. An agricultural frame according to claim 7 wherein the transverse beams are arranged so as to be inclined to both the front and rear beams at an angle different from 90° degrees and wherein the active harrow members are connected to the inclined transverse beams such that the support body lies substantially parallel to the inclined transverse beams so as to be inclined relative to a direction at right angles to the forward direction.

11. An agricultural frame according to claim 7 wherein the plurality of tines mounted on the support body project outwardly from the support body at longitudinally spaced positions along the length of the body and angularly spaced positions around the axis of the body, each of the tines having at least a main body portion thereof inclined to the axis of the support body at an acute angle less than 90° degrees.

12. An agricultural frame according to claim 7 wherein the active harrow member includes a support arm structure therefor comprising a clamping member for engaging upon a beam of the frame, a pair of spaced downwardly depending support brackets connected on said clamping assembly and a rearwardly extending support frame mounted on said brackets for pivotal movement about a horizontal axis, the frame including a transverse beam extending along the length of the support body, the beam being adjustable in angle to move one end of the beam forwardly and rearwardly to adjust the angle of the support body relative to the frame, ends of the beam being turned rearwardly and downwardly and supporting bearing means for rotation of the support body relative to the beam about an axis substantially parallel to the beam.

13. An agricultural frame according to claim 1 wherein the centre frame includes a hitch frame portion pivotally coupled to the centre frame about a horizontal axis transverse to the forward direction and means for adjusting the position of the hitch frame portion relative to the centre frame so as to raise and lower a forward end of the centre frame relative to the hitch of the tractor.

14. An agricultural frame for propulsion of ground working implements across a field in a working position and in a transport position comprising a centre frame having a hitch portion for attachment to a tractor, ground wheels mounted on the centre frame for movement of the centre frame across the ground in a direction of forward movement, a pair of rigid wing frames attached to the centre frame each of a respective side of the centre frame, a single ground wheel mounted on each wing frame for movement of the wing frame across the ground, a plurality of ground working implements each mounted on a respective one of the centre frame and the wing frames for movement therewith, first connecting means connecting each wing frame to the centre frame for pivotal movement about a horizontal axis substantially parallel to the forward direction, second connecting means connecting each wing frame to the centre frame for pivotal movement about a vertical axis for movement from a working position in which a longitudinal axis of the wing frame projects outwardly to a respective side of the centre frame in a direction at right angles to the forward direction to a transport position trailing rearwardly of the centre frame in which the longitudinal axis extends therefrom in a direction parallel to the forward direction, hydraulic cylinder means for steering the single ground wheel on each wing frame from a position at right angles to said longitudinal axis to a position parallel to said longitudinal axis, each wing frame including a front beam parallel to the longitudinal axis and a rear beam parallel to said longitudinal axis and spaced rearwardly of the front beam and a plurality of transverse beams interconnecting the front and rear beams, said beams and ground wheel of each wing frame being arranged such that, in the working position, the front beam extends at right angles to the forward direction in front of said ground wheel and the rear beam extends at right angles to the forward direction rearwardly of said ground wheel, a first set of ground working implements being mounted on each wing frame adjacent the front beam, a second set of ground working implements being mounted on the wing frame adjacent the rear beam said second connecting means being arranged to provide said vertical axis adjacent said rear beam, and latch means for releasable coupling between the centre frame and the wing frame at a position forwardly of said vertical pivot axis wherein said first connecting means defines said horizontal axis through a first pivot coupling on said rear beam and a second pivot coupling defined at said latch means, and wherein the latch means includes a pin having a longitudinal axis of the pin lying along said horizontal axis with the pin mounted on one of said centre frame and said wing frame, a receptacle mounted on the other of said centre frame and said wing frame for receiving said pin for pivotal movement of the pin relative to the receptacle about said axis longitudinal of the pin and transverse to the receptacle and a latch member for engaging the pin and pulling the pin into said receptacle said latch means thus providing one part of said first connecting means.

15. An agricultural frame according to claim 14 including means for communicating forward movement to said wing frame from said centre frame consisting solely of said second coupling means and said latch means.

16. An agricultural frame according to claim 14 wherein said ground wheel of said wing frame is positioned between said front and rear beams.

17. An agricultural frame according to claim 14 wherein the centre frame includes a first and a second ground wheel each mounted on a respective side thereof so as to extend outwardly to the respective side, the ground wheel on each side being positioned between the front and rear beams of the wing frame and inwardly of an inner most one of the transverse beams.

18. An agricultural frame according to claim 14 wherein each wing frame includes an extension member extending therefrom along a portion of the centre frame and wherein the second coupling means is arranged to define said vertical axis at an inner end of said extension member inwardly of the respective side of the centre frame.

19. An agricultural frame for propulsion of ground working implements across a field in a working position and in a transport position comprising a centre frame having a hitch portion for attachment to a tractor, ground wheels mounted on the centre frame for movement of the centre frame across the ground in a direction of forward movement, a pair of wing frames attached to the centre frame each at a respective side of the centre frame, a ground wheel mounted on each wing frame for movement of the wing frame across the ground, a plurality of ground working implements each mounted on a respective one of the centre frame and the wing frames for movement therewith, means mounting each ground wheel on the respective one of the centre and wing frames for movement in a vertical direction relative to the respective one of the frames from a first position in which the ground working implements on said one frame are in ground working engagement with the ground to a second raised position in which the ground working implements are in raised non-operative position above the ground, means connecting each wing frame to the centre frame for pivotal movement about a horizontal axis substantially parallel to the forward direction, each wing frame including a front beam parallel to said longitudinal axis, a rear beam parallel to said longitudinal axis and a plurality of transverse beams interconnecting the front and rear beams, wherein said ground working implements comprise a plurality of active harrow members each including a support body for rotation relative to the ground and a plurality of tines projecting from the support body, wherein the ground working implements further include a plurality of packer assemblies each including packer surfaces for engaging the ground, wherein there is provided means mounting the active harrow members and the packer assemblies on the frame such that the active harrow members are arranged substantially in a row across the frame for providing the harrowing action across the full width of the frame and such that the packer members are arranged substantially in a row across the frames so as to provide a packing action across the full width of the frame, wherein the active harrow members and the packer assemblies each include support arm means extending rearwardly from a point of connection on the frame to the respective one of the active harrow members and packer assemblies, wherein the support arm means of one of the rows is arranged in front of the other row, wherein one of the rows is mounted at a position adjacent the front beam and the other of the rows is mounted adjacent the rear beam and means for latching each of the active harrow members in a raised position such that in the raised position only the packer assemblies are in engagement with the ground.

20. An agricultural frame according to claim 19 wherein the plurality of tines mounted on the support body project outwardly from the support body a longitudinally spaced positions along the length of the body and angularly spaced positions around the axis of the body, each of the tines having at least a main body portion thereof inclined to the axis of the support body at an acute angle less than 90° degrees.

21. An agricultural frame according to claim 19 wherein the active harrow member includes a support arm structure therefor comprising a clamping member for engaging upon a beam of the frame, a pair of spaced downwardly depending support brackets connected on said clamping assembly and a rearwardly extending support frame mounted on said brackets for pivotal movement about a horizontal axis, the frame including a transverse beam extending along the length of the support body, the beam being adjustable in angle to move one end of the beam forwardly and rearwardly to adjust the angle of the support body relative to the frame, ends of the beam being turned rearwardly and downwardly and supporting bearing means for rotation of the support body relative to the beam about an axis substantially parallel to the beam.

22. An agricultural frame according to claim 19 wherein the centre frame includes a hitch frame portion pivotally coupled to the centre frame about a horizontal axis transverse to the forward direction and means for adjusting the position of the hitch frame portion relative to the centre frame so as to raise and lower a forward end of the centre frame relative to the hitch of the tractor.

23. An agricultural frame for propulsion of ground working implements across a field in a working position and in a transport position comprising a centre frame having a hitch portion for attachment to a tractor, ground wheels mounted on the centre frame for movement of the centre frame across the ground in a direction of forward movement, a pair of wing frames attached to the centre frame each at a respective side of the centre frame, a ground wheel mounted on each wing frame for movement of the wing frame across the ground, a plurality of ground working implements each mounted on a respective one of the centre frame and the wing frames for movement therewith, means mounting each ground wheel on the respective one of the centre and wing frames for movement in a vertical direction relative to the respective one of the frames from a first position in which the ground working implements on said one frame are in ground working engagement with the ground to a second raised position in which the ground working implements are in raised non-operative position above the ground, means connecting each wing frame to the centre frame for pivotal movement about a horizontal axis substantially parallel to the forward direction, each wing frame including a front beam parallel to said longitudinal axis, a rear beam parallel to said longitudinal axis and a plurality of transverse beams interconnecting the front and rear beams, wherein said ground working implements comprise a plurality of active harrow members each including a support body for rotation relative to the ground and a plurality of tines projecting from the support body, wherein the ground working implements further include a plurality of packer assemblies each including packer surfaces for engaging the ground, wherein there is provided means mounting the active harrow members and the packer assemblies on the frame such that the active harrow members are arranged substantially in a row across the frame for providing the harrowing action acorss the full width of the frame and such that the packer members are arranged substantially in a row across the frames so as to provide a packing action across the full width of the frame, wherein the active harrow members and the packer assemblies each include support arm means extending rearwardly from a point of connection on the frame to the respective one of the active harrow members and packer assemblies, wherein the support arm means of one of the rows is arranged in front of the other row, wherein one of the rows is mounted at a position adjacent the front beam and the other of the rows is mounted adjacent the rear beam and means for latching each of the active harrow members in a raised position such that in the raised position only the packer assemblies are in engagement with the ground and wherein the transverse beams are arranged so as to be inclinded to both the front and rear beams at an angle different from 90° degrees and wherein the active harrow members are each connected to a respective one of the inclined transverse beams such that the support body thereof lies substantially parallel to the respective inclined transverse beam so as to be inclined relative to a direction at right angles to the forward direction.

* * * * *